US005440599A

United States Patent [19]
Rodack et al.

[11] Patent Number: 5,440,599
[45] Date of Patent: Aug. 8, 1995

[54] SPACER GRID WITH INTEGRAL "SIDE SUPPORTED" FLOW DIRECTING VANES

[75] Inventors: Thomas Rodack, Granby; Zeses E. Karoutas, Simsbury; Richard P. Broders, Grandy, all of Conn.

[73] Assignee: Combustion Engineering, Inc., Windsor, Conn.

[21] Appl. No.: 191,122

[22] Filed: Feb. 3, 1994

[51] Int. Cl.6 ............................................. G21C 3/34
[52] U.S. Cl. ...................... 376/439; 376/438; 376/442; 376/462; 376/441; 376/443
[58] Field of Search ............. 376/439, 438, 442, 462, 376/443, 441; 976/DIG. 78, DIG. 79

[56] References Cited

U.S. PATENT DOCUMENTS

| | | | |
|---|---|---|---|
| 3,395,077 | 7/1968 | Tong et al. | 376/439 |
| 3,481,832 | 12/1969 | Rickert | 376/353 |
| 3,764,470 | 10/1973 | Calvin | 376/439 |
| 3,809,609 | 5/1974 | Krawiec et al. | 376/439 |
| 3,847,736 | 11/1974 | Bevilacqua | 376/439 |
| 3,862,000 | 1/1975 | Pugh et al. | 376/439 |
| 4,039,379 | 8/1977 | Patterson et al. | 376/439 |
| 4,089,741 | 5/1978 | Patterson et al. | 376/439 |
| 4,519,593 | 5/1985 | Kobuck et al. | 269/40 |
| 4,692,302 | 9/1987 | DeMario et al. | 376/439 |
| 4,698,204 | 10/1987 | Taleyarkhan | 376/439 |
| 4,728,489 | 3/1988 | Hatfield | 376/439 |
| 4,827,063 | 5/1989 | Bokers et al. | 376/439 |
| 4,844,860 | 7/1989 | Hatfield | 376/439 |
| 4,879,090 | 11/1989 | Perrotti et al. | 376/462 |
| 5,283,821 | 2/1994 | Karoutas | 376/439 |
| 5,299,245 | 3/1994 | Aldrich et al. | 376/439 |
| 5,303,276 | 4/1994 | DeMario et al. | 376/442 |
| 5,307,393 | 4/1994 | Hatfield | 376/442 |

FOREIGN PATENT DOCUMENTS 0261544 3/1988 European Pat. Off. .
0596786 5/1994 France .

OTHER PUBLICATIONS

International Search Report.

Primary Examiner—Donald P. Walsh
Assistant Examiner—Meena Chelliah
Attorney, Agent, or Firm—Ronald P. Kananen; John H. Mulholland

[57] ABSTRACT

A nuclear fuel rod spacer grid is formed of slottedly interlocked sets of flat strips. One set of strips is formed with integral coplanar tab portions which have one or more edge portions bent at angles to form integral mixing vanes.

6 Claims, 6 Drawing Sheets

000# SPACER GRID WITH INTEGRAL "SIDE SUPPORTED" FLOW DIRECTING VANES

FIELD OF THE INVENTION

The present invention relates to nuclear reactors and more particularly to a grid arrangement for supporting bundles or assemblies of fuel elements in the reactor. More specifically, the present invention relates to a welded fuel rod spacer grid which is formed with "side-supported" integral flow directing vanes that direct fluid flow about the fuel rods for increased heat transfer.

BACKGROUND OF THE INVENTION

Fuel assemblies for pressurized water nuclear reactors generally include one or more fuel rod arrays which are maintained in position by a structure which includes a plurality of welded spacer grids, a lower end fitting and an upper end fitting. Guide thimbles provide the structural integrity between the lower end fitting, the upper end fitting and the spacer grids intermediate the ends of the fuel assembly. The spacer grids define an array of fuel rods which, typically, may be rows and columns of 16 rods each. An example of such a spacer and support grid is disclosed in U.S. Pat. No. 3,481,832.

A typical spacer grid which is used to maintain a spaced array of nuclear fuel rods and which is disposed at a location intermediate the fuel rod ends includes a generally quadrangular or other polygonal perimeter. A plurality of fuel rod compartments or cells within the perimeter are defined by first and second grid-forming members or strips welded to the perimeter and joined to each other at their respective intersections. The grid-forming members of the fuel rod spacer grid are slotted along part of their width and assembled and interlocked with one another to form what resembles an "egg-crate"-like structure. This structure is utilized because it provides a good strength-to-weight ratio without severely affecting the flow of cooling or moderating fluid through the grid of the nuclear reactor. The grid strips typically include projecting springs and arches for engaging and supporting the fuel elements within the grid compartments. Thus, at each fuel rod grid position in the fuel assembly, axial, lateral and rotational restraint is provided to resist fuel rod motion which tends to be produced by influences such as coolant flow, seismic disturbance or external impact. The spacer grids also act as lateral guides during insertion into and withdrawal of the fuel assembly from the reactor. All of the elements of the fuel lattice, including the springs and the arches within the compartments, are arranged with respect to the fuel coolant flow in order to minimize obstruction to fluid flow and the resulting pressure drop across the grid.

U.S. Pat. No. 3,395,077 discloses a grid arrangement wherein flow directing vanes are formed integrally with the grid strips. However, these vanes are bent at angles with respect to the plane of the relatively flat strips which form the grid to define acute angles in the range of 20° to 40°, and preferably 20°. This bending process is such as to initiate at the upper edge of the strip and creates a problem in that the vane is supported by a narrow base which is twisted and bent and which carries a localized load resulting in high stresses.

These and other prior art vanes, each of which provides support for the vane at the vane base where it is attached to the grid strip, may provide adequate support for the vane while the assembly is in the reactor; however, the bend angle is somewhat difficult to control and the vanes are easily damaged during fabrication or fuel reconstitution.

For example, during fuel assembly reconstitution, individual fuel elements may be removed and replaced within the assembly. Individual mixing vanes which project from the strip edges in accordance with the conventional designs can become bent during the reinsertion process when the tip of the fuel element first approaches and enters the grid. This bending can lead to blockage which prevents further insertion, or to contact with the reinserted element or adjacent elements during subsequent operation. Such contact can initiate local wear and possible breaching of the fuel element cladding tube. Also, if the bending of a conventional vane at the strip edge is severe enough, the vane could fracture, break off and become debris within the circulating fluid of the nuclear reactor. Such debris is a common source of fuel element breaching in operating reactors.

To improve the thermal performance of the spacer grids, vanes integral with the grid strips are added at the top (downstream) end of the grid and bent from the vertical axis to an acute angle, generally between 20° and 40°. The bent vanes deflect the coolant to mix between the channels of the spaced parallel fuel rods or to swirl within these channels. U.S. Pat. No. 4,879,090 describes such a prior art vane design that has been built and operated with much success. U.S. Pat. Nos. 3,862,000, 4,692,302 and 4,698,204 show other vane designs, all employing horizontal bends at the top of the grid strip to deflect the narrow tip portion(s) of the vane(s) away from the vertical.

There are at least five aspects of these prior art vane designs that require improvement. First, the cantilevered, free-standing vanes which project from the upper edges of the strips are susceptible to bending damage during strip handling, grid assembly, rod loading and reconstitution. Second, the upper surface of the vane is sloped away from the rod cell that it occupies and towards the intersection. In the event that the end of the fuel rod contacts this surface during initial fabrication or reconstitution, the fuel rod would be guided away from its intended cell rather than towards it. Third, the placement and bending direction of the vanes have been such that vanes are necessary on at least some strips in both orthogonal directions. This makes the interlocking of the grid strips into a spacer grid assembly more difficult because, during grid assembly, the vane(s) on the strips with their slots on the top must pass by the rod support features of the strips with their slots on the bottom. Fourth, since the widest portion of the vane is adjacent to the top of the grid, the pressure drop associated with the vane is coupled hydraulically to that of the grid assembly. Fifth, free standing vanes suffer a loss of efficiency in flow redistribution due to leakage losses at the open sides of the vanes.

Some spacer grid designs (Allowed application U.S. Ser. No. 07/905,922, filed Jun. 29, 1992 and U.S. Pat. No. 4,089,741, for example) have addressed the first aspect mentioned above (susceptibility to bending damage) by adding a tab on the orthogonal strip to support the underside of the vane. These designs improve the ability of the vanes to withstand loads without damage, but at the expense of additional tabs that could themselves be damaged during grid assembly and, in some designs, require additional welding. It should be noted that although the supported tab would prevent damage of the vane, these designs still tend to guide a fuel rod away from its intended cell.

The Allowed application U.S. Ser. No. 07/905,922 referenced above also used the vane support tab to address the concern of lateral flow leakage on the underside of the vane. Again, this was at the expense of an additional tab and its possible ramifications during grid assembly.

SUMMARY OF THE INVENTION

It is a prime object of the present invention to provide "side-supported" vanes which address all five of the above aspects and to provide arrangements which are much less susceptible to bending damage, which guide fuel rods toward their intended cell, which are easily assembled, which help in decoupling the vane pressure drop from the grid assembly pressure drop, and which minimize lateral flow leakage, while improving the thermal hydraulic performance of the spacer grid assembly.

It is another object of the present invention to provide a strip arrangement which can be readily assembled into a fuel rod supporting grid or the like, and which enables flow directing vanes to be formed in a manner which reduces the chances of contact with and possible damage by the fuel rods during removal or replacement of the fuel rods.

It is a further object of the invention to enable so called "side-supported" flow directing vanes to be produced by bending one or more edge portions of tabs or crenulation-like portions which extend from an edge of selected strips and which are essentially coplanar therewith.

It is another object of the present invention to provide "side-supported" vanes which exhibit a geometry which is less subject to damage by fuel elements during reconstitution, thereby attenuating the possibility of contact with fuel rods and the like and the resulting formation of debris during reactor operation.

The above objects are achieved by an arrangement wherein a nuclear fuel rod spacer grid is formed of slottedly interlocked sets of essentially flat strips. One set of strips is formed with integral coplanar tab portions which have one or more edge portions bent at angles to form integral mixing vanes.

Fluid flow directing vanes or "mixing vanes" provided in accordance with the present invention are formed on tabs which are integral with a strip which constitutes the grid, by bending one or more side portions of the tab. This enables vanes which are elongate and supported by the integral tabs in a manner wherein they are provided with greater resistance to loads imposed in the axial direction, makes the bend angle with respect to the plane of the strip on which the tab is formed more controllable, and reduces pressure losses. Moreover, these "side-supported" vanes allow greater flexibility in vane placement to achieve desired swirl and flow patterns. In the disclosed embodiments, the vanes are sufficiently spaced from the grid strips to enable the vanes to be moved sufficiently downstream from the exit plane of the grid strip to hydraulically decouple the vane from the flow restriction presented by the grid strip and weld material in the exit plane.

The vane arrangement according to the present invention therefore provides a lower pressure drop per given vane area.

More specifically, a first aspect of the invention resides in a nuclear fuel rod spacer grid comprising: a first set of strips which is slottedly interlocked with a second set of strips; a plurality of integral tabs formed on each of the first strips; and side-supported vanes comprising a portion of each of the tabs which is bent along a predetermined bend line which extends outwardly along each of the tabs and which is coplanar with the strip on which each the tabs is formed.

Another aspect of the invention resides in a nuclear fuel rod spacer grid comprising: a set of first strips which are each formed with a plurality of first slots which extend from an upper edge thereof; a set of second strips which are each formed with a plurality of second slots which extend from a lower edge thereof, the second strips being interleaved with the first strips so that the first and second slots respectively receive portions of the second and first strips which are contiguous with the second and first slots; a plurality of integral tabs formed exclusively on an upper edge of each of the second strips and which are coplanar with the second strips; and side-supported vanes comprising a portion of each of the tabs which are bent along a predetermined bend line which extends outwardly along each of the tabs and which is coplanar with the strip on which each the tabs is formed.

BRIEF DESCRIPTION OF THE DRAWINGS

The various features and advantages of the present invention will become more clearly understood as a description of the preferred embodiments is made with reference to the appended drawings in which.

In the various Figures, the fuel rod support features, including springs and arches, are omitted for purposes of clarity.

DESCRIPTION OF THE PREFERRED EMBODIMENTS

The fuel rods support grid according to the invention is generally designated by the numeral 10 and includes a first set of parallel strips 12 which are slottedly interlocked with a second set of parallel strips 14 which are arranged at right angles to the first set. The intersections defined between each of the first and second sets of strips are welded to provide a permanent interconnection.

Figure 2:
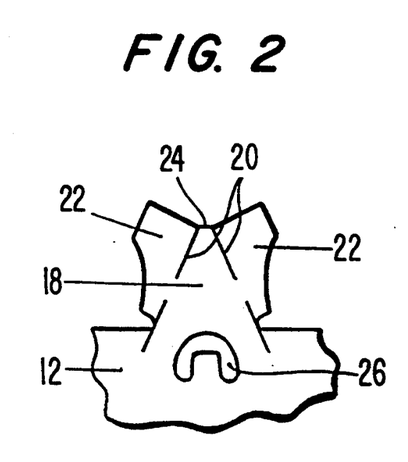
FIG. 2 is a side-elevational view showing a fragmentary portion of a FIG. 1 grid strip which illustrates the integral tab and side-supported vanes before they have been bent along the dotted-in bend lines.

As seen in FIG. 2, the strips have integral tabs 18 which extend upwardly from their upper or downstream edges. These tabs are each so shaped that they can be bent along a pair of bend lines 20 such as are shown in FIG. 2 to form a pair of "side-supported" vanes 22. As will be appreciated, the tabs 18 are coplanar with the strips 12 so that the bend lines extend generally in the direction of coolant flow through the grid 10.

Figure 1:
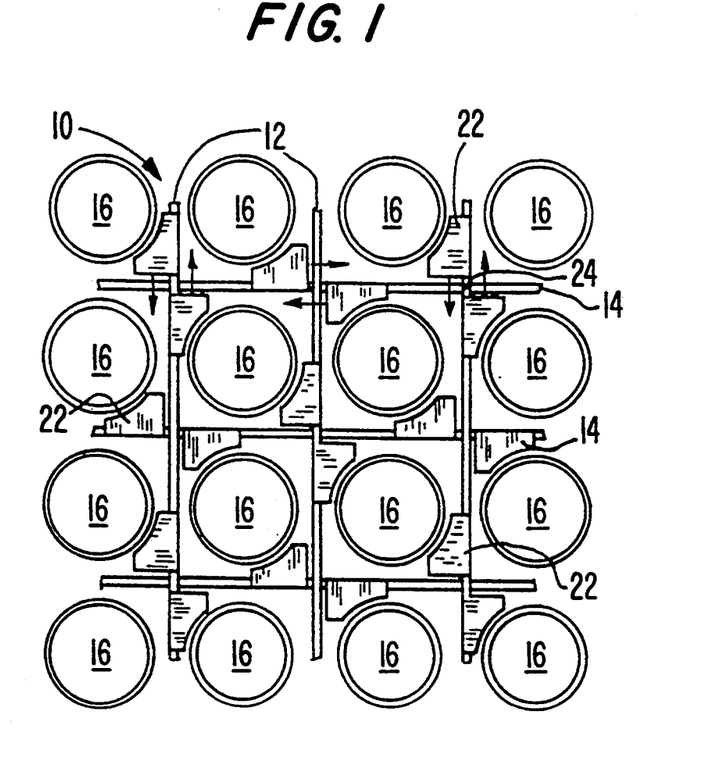
FIG. 1 is a plan view of a portion of a fuel rod spacer grid with spaced side-supported vanes provided in accordance with a first embodiment of the present invention.

The vanes 22 in accordance with the first embodiment are bent by predetermined amounts in opposite directions as indicated in FIG. 1. That is, one vane is bent "outwardly" so as to extend in the direction of the viewer, while the other is bent "inwardly" and away from the viewer. A flat upper edge portion 24 is defined at the apex of the tab 18 as it appears after the vanes are bent at the predetermined angles with respect to the tab 18.

Figure 3:
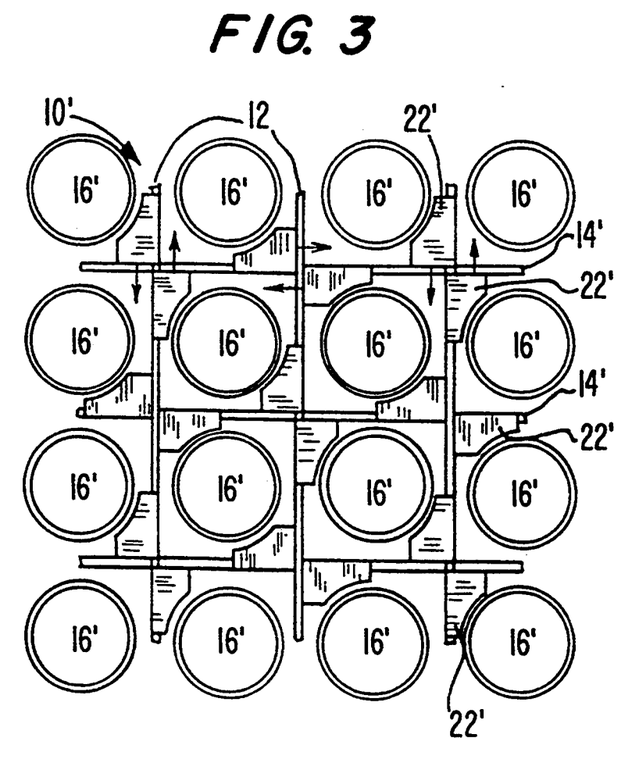
FIG. 3 is a plan view of a portion of a second embodiment of a fuel rod spacer grid with contiguous side-supported vanes provided according to the present invention.
Figure 4:
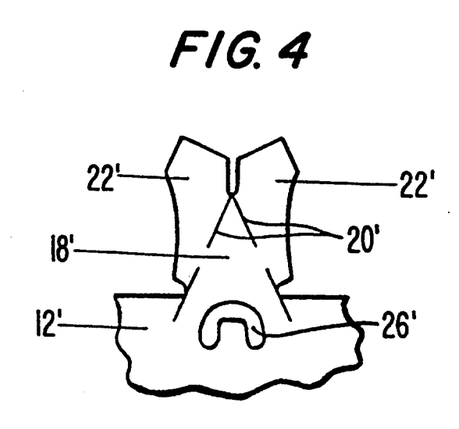
FIG. 4 is a side elevational view of a fragmentary portion of a FIG. 3 grid strip illustrating the integral tab and side-supported vanes before they have been bent along the dotted-in bend lines.

In the embodiment illustrated in FIGS. 3 and 4, the grid 10' has integral side-supported vanes 22' which are contiguous and are side-supported by the integral tabs 18' formed on the strips 12'. In this instance also, the vanes are formed by bending the tab along bend lines 20'. In this embodiment, the bend lines converge at a point and in a manner which eliminates the upper edge portion 24. The contiguous side-supported vanes 22' which result from the bending of the tab can be seen in the plan view of FIG. 3.

As shown in FIGS. 1 and 3, the flow directing vanes 22 and 22' are such as to create coolant flow components which leave the mixing vanes generally in the direction indicated by the small arrows.

Figure 5:
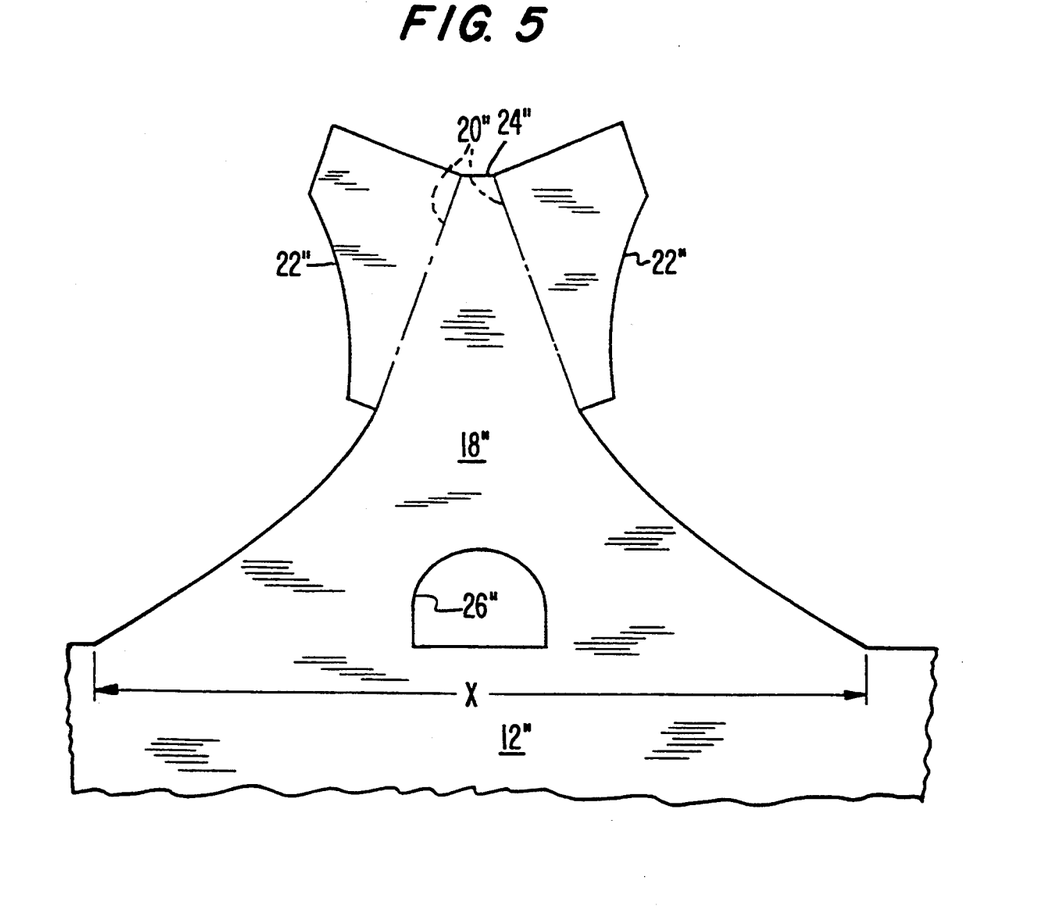
FIG. 5 is a side elevational view similar to FIGS. 2 and 4 which depicts an arrangement which characterizes a third embodiment of the present invention.

In a third embodiment, shown in FIG. 5, the strip 12" is provided with a predetermined number of integral tabs 18" each of which is bent along bend lines 20" to form pairs of side-supported elongated vanes 22". In this instance, each pair of vanes are separated by an edge portion 24". The base width "X" of each support tab 18" is selected to endow it and the vanes which are integral therewith with a desired amount of mechanical support and rigidity which is sufficient to enable the required mixing and longevity requirements to be met.

The dimension "X" is constrained by factors such as the fuel rod pitch and the number of mixing vanes per intersection. Before bending, the side-supported mixing vanes and the strips which are used in the first, second, or third embodiment, for example, can be fixedly interconnected using a weld nugget technique. To facilitate this type of welding, cut-outs 26 can be formed in each strip 12 to accommodate the nuggets which are created.

Figure 6:
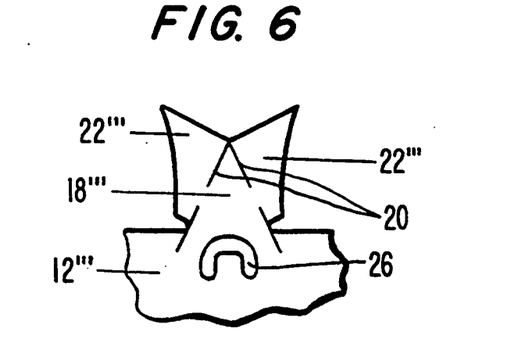
FIG. 6 is a side elevational view similar to FIGS. 2, 4 and 5 which shows an arrangement according to a fourth embodiment.

FIG. 6 illustrates a fourth embodiment which features contiguous mixing vanes 22'" formed by bending the sides of the integral support tab 18'" along bend lines 20'". Similar to the above embodiments, the bend lines 20'" are coplanar with the strips 12 and converge generally in the direction of coolant flow through the grid.

Thus, the mixing vanes according to the present invention are stronger than existing vanes, result in lower pressure drop, and produce equal or superior critical heat flux performance relative to the existing spacer grid designs. Moreover, grids made according to the principles of the invention utilizing the side-supported mixing vanes have bend angles which are easier to maintain under operating and fuel reconstitution conditions.

Figure 7:
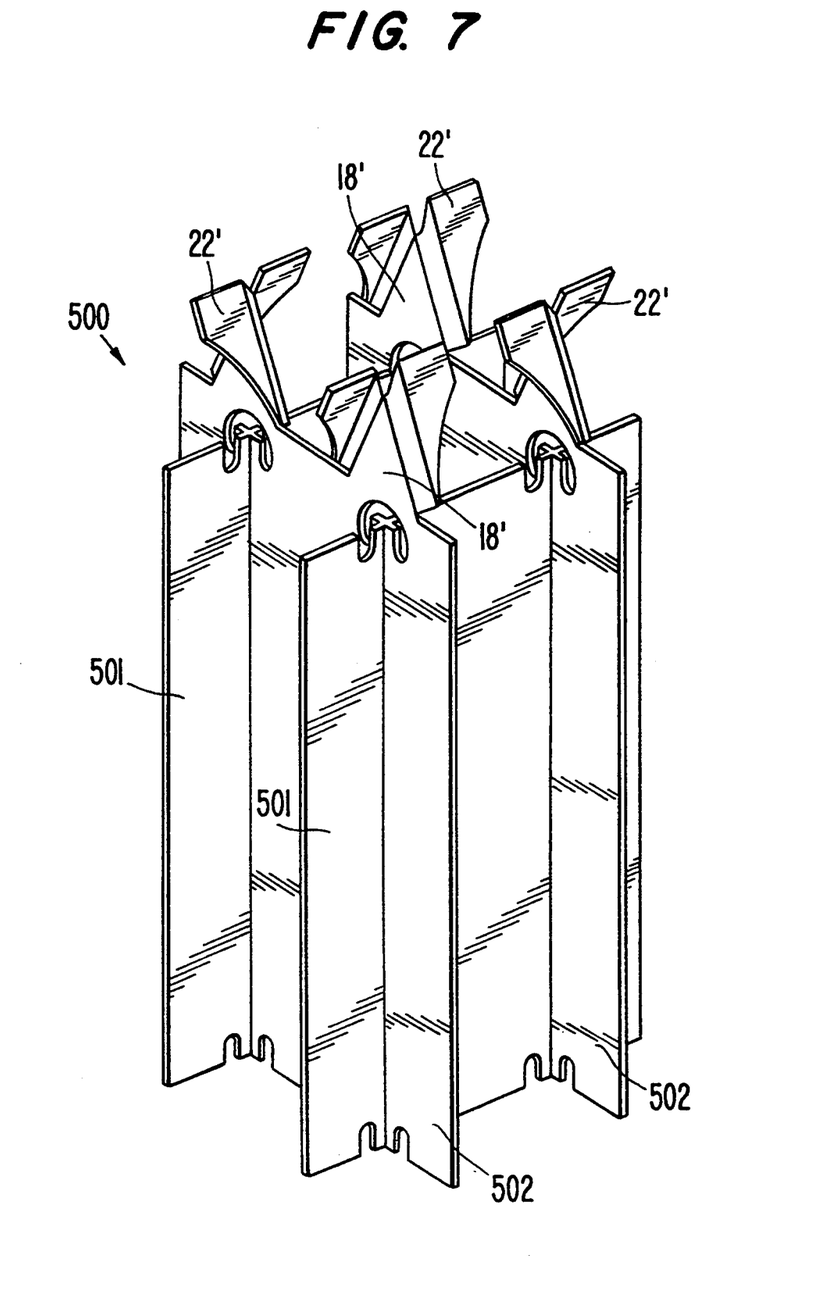
FIG. 7 is a perspective view showing a fifth and preferred embodiment of the invention.

FIG. 7 shows the preferred embodiment of the present invention. In this arrangement, the spacer grid assembly 500 is comprised of a set of strips 501 which are slotted on the top side, interlocked with the set of strips 502 which are slotted on their bottom side, and welded together at the intersection joints. The strips 501 slotted on the top do not have any vanes, only rod support features, and, as such, can be used in the fabrication of unvaned spacer grid assemblies as well as vaned spacer grid assemblies. The strips 502 slotted on the bottom have vanes on the top side that are located at the desired intersection joints. The assembling of the interlocking strips is greatly simplified compared to the prior art because the interleaving of the "slots-top" strips 501 (no vanes) and the "slots-bottom" strips 502 (vaned) does not require the vanes to pass by any rod support features.

The flow directing vanes 22' provided according to the principals of the invention are formed by bending portions of a tab 18' which are integral with the grid strip (see FIG. 4). This results in the each vane 22' being supported along its side rather than along its base as in the case of the prior art arrangements. The angle of the bend axis can be varied to achieve the desired flow characteristics with typical angles being in the 20° to 40° range. The angle to which the vane is bent can also be varied, the preferred embodiment is 90° but angles of more or less than 90° can be used. The bending of the vane 22' along its side rather than its base stiffens the vane so it is much less vulnerable to damage due to a change in the bend angle, and provides significantly more support for loads imposed on the vane by the fuel rod end cap during initial rod insertion or reconstitution. Also with regards to rod insertion, the slope of the upper edge of the vane is such that it would guide a fuel rod end cap into its intended cell.

The orientation of the vane 22' after bending has the narrow portion of the vane toward the bottom (near the top of the main grid strips) and the wide portion of the vane toward the top. Since the wider portion of the vane blocks or redirects more flow than the thinner portion, and since it is further removed axially from the main body of the spacer grid assembly, it helps to decouple the hydraulic effect of the vane from that of the grid, thereby reducing the pressure drop and increasing the free-stream flow deflected by the vane 504 compared to a vane aligned in the prior art orientation.

The portion of the integral tab 18' that remains in the plane of the strip not only serves to reinforce the vane but also to minimize lateral leakage of the flow that has been redirected by the vane attached to the tab. The "sidewall" forces more of the flow to continue up the underside of the vane and exit at the end of the vane 22', as intended.

High pressure water tests with electrically heated rods have been performed in 6×6 rod arrays with side-supported mixing vanes to assess the performance of the side-supported mixing vanes relative to grids without vanes. The power required to cause Departure from Nucleate Boiling was measured in these tests. A comparison of the performance of the side-supported vaned grids relative to grids without vanes is provided in FIG. 11.

Figure 11:
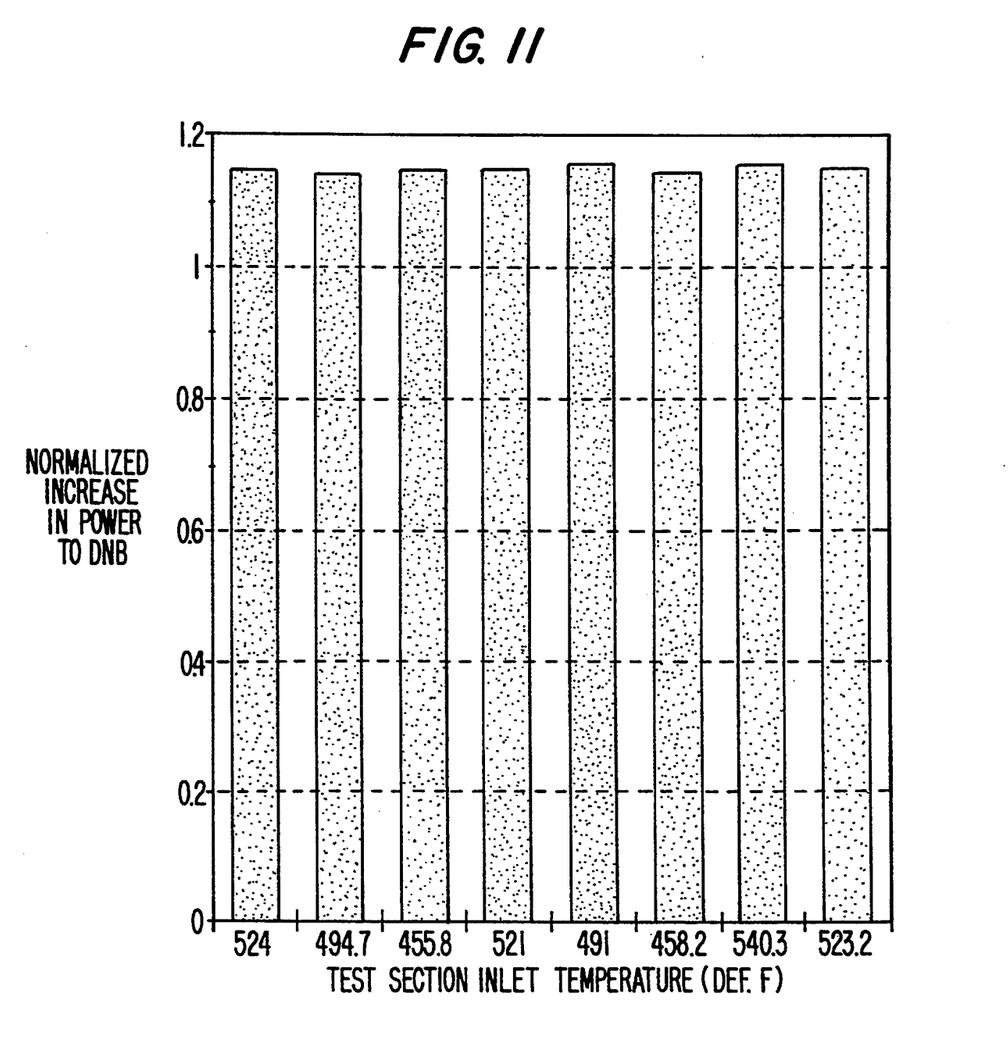
FIG. 11 is a bar graph which is plotted in terms of Departure from Nucleate Boiling vs. water temperature at the test section inlet, demonstrating the effect of the invention.

More specifically, FIG. 11 presents a plot of the ratio of test section power to cause Departure from Nucleate Boiling to the test section power predicted to cause Departure from Nucleate Boiling in the absence of the mixing vanes. This ratio is plotted vs. the temperature of water at the inlet to the test section. The side-supported vanes clearly improve Departure from Nucleate Boiling performance since the ratio is everywhere greater than 1.

Figure 8:
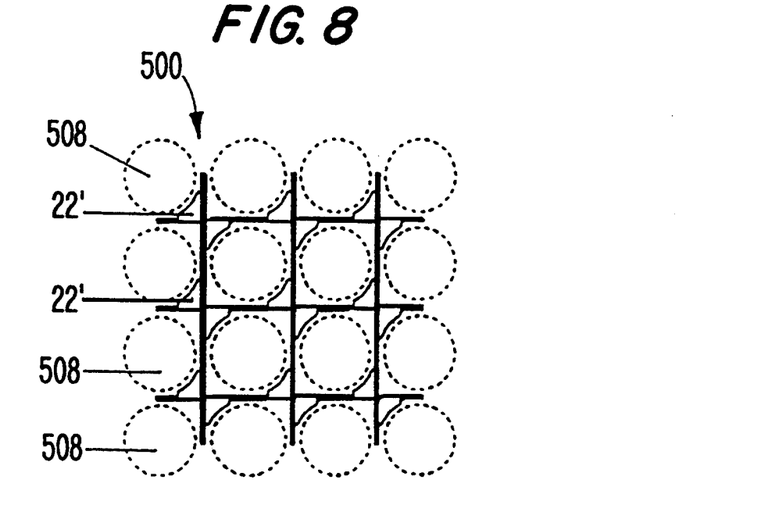
FIGS. 8, 9 and 10 show various vane arrangements which can be achieved and which can be used to produce various swirl patterns within the fuel rod arrays.
Figure 9:
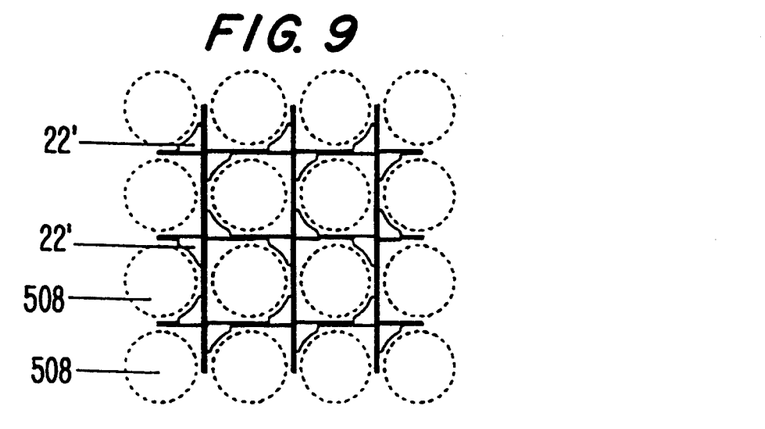
Figure 10:
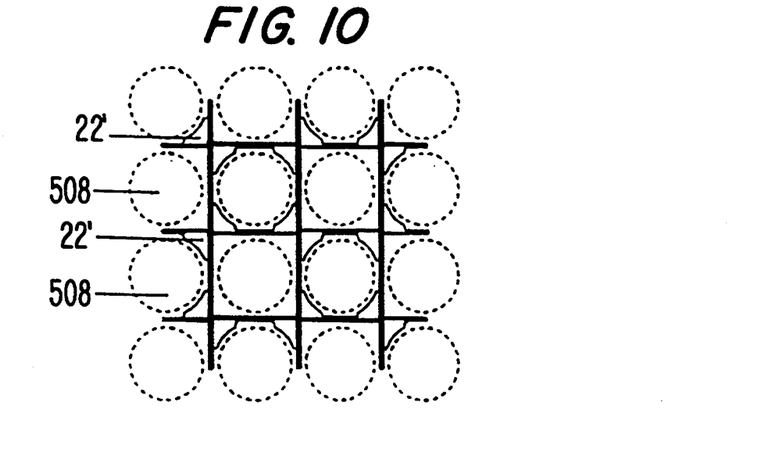

It will be noted that while a typical configuration of the preferred embodiment is shown in FIG. 7 with the pre-bend tab geometry of FIG. 7 shown in FIG. 4, it is within the scope of the invention to use alternative vane geometries to tailor the desired flow characteristics. Two possible examples are shown in FIGS. 2 and 6. By alternating the direction of bending of the vanes, various swirl patterns within an array of fuel rods 508 can be achieved (see FIGS. 8, 9 and 10).

In view of the above disclosure, the various possible changes and modifications which are possible without departing from the scope of the present invention will be self evident to those skilled in the art of spacer grid designs.

What is claimed is:

1. A nuclear fuel rod spacer grid comprising:
   a first set of strips which is slottedly interlocked with a second set of strips;
   a plurality of integral tabs formed on each of said first strips and which are coplanar with said first strips; and
   side-supported vanes comprising a portion of each said tab which is bent along a predetermined bend line which extends outwardly along each said tab and which is coplanar with the strip on which each said tab is formed.

2. The nuclear fuel rod spacer grid of claim 1, in which the vanes are supported by said tabs in a manner wherein they are spaced from the strips by an amount sufficient that they become fluidly decoupled from the flow restriction caused by said first and second sets of strips.

3. The nuclear fuel rod spacer grid as set forth in claim 2, further comprising a flow control vane which comprises a portion of said integral tab which is bent at a predetermined angle with respect to the portion of said tab which is coplanar with said first strip and along a bend line which is coplanar with said first strip.

4. A nuclear fuel rod spacer grid as set forth in claim 3, wherein said first tabs each assume an essentially triangular shape after the at least one edge portion is bent to form said flow deflecting vane.

5. A nuclear fuel rod spacer grid comprising:
   a set of first strips which are each formed with a plurality of first slots which extend from an upper edge thereof;
   a set of second strips which are each formed with a plurality of second slots which extend from a lower edge thereof, said second strips being interleaved with said first strips so that said first and second slots respectively receive portions of said second and first strips which are contiguous with said second and first slots;
   a plurality of integral tabs formed exclusively on an upper edge of each of said second strips and which are coplanar with said second strips; and
   side-supported vanes comprising a portion of each of said tabs which is bent along a predetermined bend line which extends outwardly along each of said tabs and which is coplanar with the strip on which each said tabs is formed.

6. A nuclear fuel rod spacer grid as set forth in claim 5, further comprising a plurality of essentially inverted U-shaped apertures which are formed in each of said first strips, each of said essentially inverted U-shaped apertures being formed in said strips so as to proximate a base portion of a tab and so dimensioned and located as to facilitate welding of said first and second strips.

* * * * *